Feb. 14, 1939.  G. MÖLLER  2,146,906
DEVICE FOR ADJUSTING A ROTATABLY AND TILTABLY MOUNTED TABLE
WITH RESPECT TO THE AXIS OF A DRILLING SPINDLE
Filed March 4, 1938   3 Sheets-Sheet 2
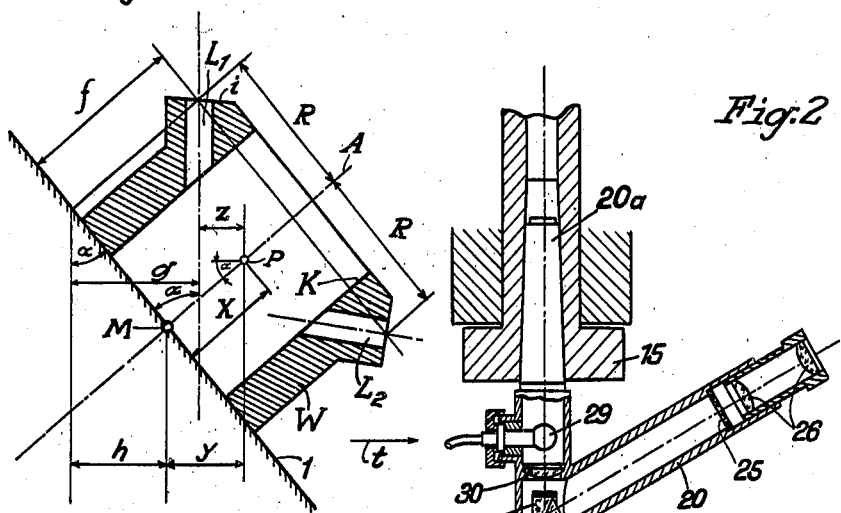
Inventor:
Georg Möller

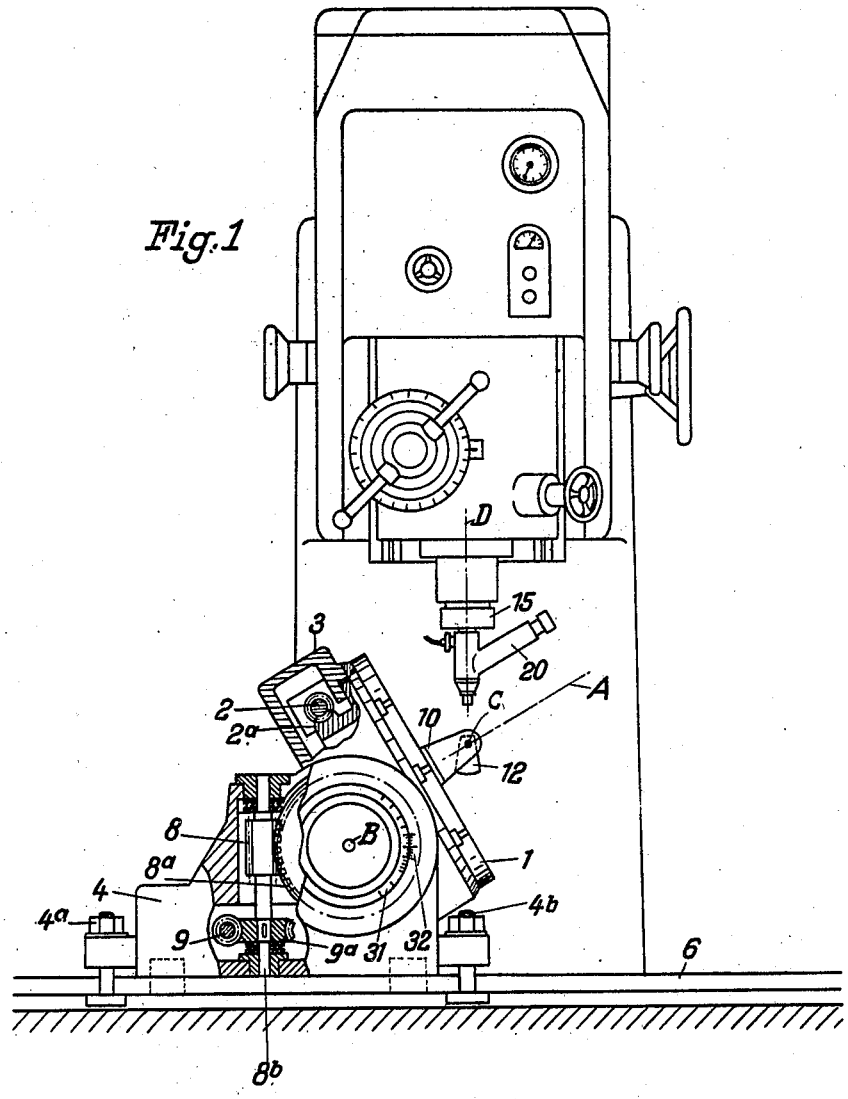

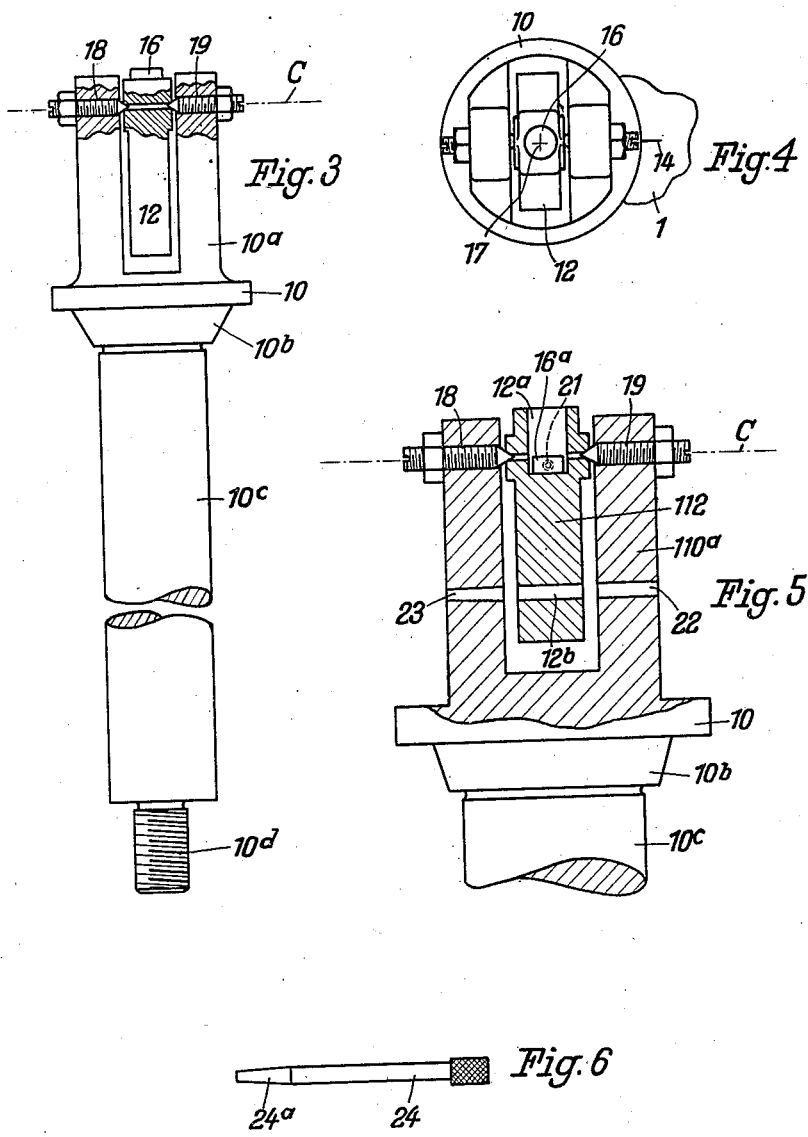

Patented Feb. 14, 1939

2,146,906

UNITED STATES PATENT OFFICE 2,146,906

DEVICE FOR ADJUSTING A ROTATABLY AND TILTABLY MOUNTED TABLE WITH RESPECT TO THE AXIS OF A DRILLING SPINDLE

Georg Möller, Berlin-Neukoelln, Germany, assignor to Herbert Lindner, Berlin-Wittenau, Germany Application March 4, 1938, Serial No. 194,005
In Germany March 20, 1937

6 Claims. (Cl. 77—5)

My invention relates to a device for adjusting a rotatably and tiltably mounted table with respect to the axis of the drilling spindle of a drilling machine, and more particularly to a drilling machine having coordinate drills by the use of sight microscopes and a straightening mark.

It is well known to use a microscope for the purpose of adjusting the edge of a workpiece on a working table which moves in straight lines, said microscope being mounted on the drilling spindle, together with a back-square which can be set on the workpiece edge and which has a dress mark. In such tables, to ascertain the starting point for the adjustment according to polar coordinates, a spirit level is used, which is brought in relation with the turning axis of the table and the drilling spindle axis by an assisting means. This starting point is obtained on a simple table when its turning axis corresponds with that of the drilling spindle axis. In a rotatably and tiltably mounted table, that is, a table whose table top is adjustable to a tilting axis running vertical to its turning axis on an angle of 0–90°, a point is selected which is located at a certain distance from the table surface on the pivoting axis of the table, and which is brought into alinement with the drilling spindle axis. This point is marked by a ball which is mounted on a bolt that can be inserted in the journal of the table. On this ball, one end of the spirit level is placed, while the other end is held in the cone point stuck in the drilling spindle. The worktable of the drilling machine on which such a table rests, as well as the drilling shoe, are then adjusted to each other until the spirit level whose ends must be turned several times in this operation shows level.

The adjustment with the spirit level is difficult and in many cases not sufficiently accurate. Where greater accuracy is required, it has been the custom to use a clock dial micrometer. This consists of a measuring clock carrier which is brought into contact with the parts to be adjusted in the same manner as in the case of the spirit level, the clock dial micrometer and an arm coupled with the cone point in the drilling spindle device which is connected by an intermediate link to the sensitive point of the clock dial micrometer. The adjustment is again made by adjusting the main slide of the machine while turning, in the meantime, the drilling spindle with the tool.

The invention of the application has for an object to create an adjusting device which stands out over known devices by its simplicity of construction and handling, and which guarantees a high adjusting accuracy.

A further object of the invention consists of a novel arrangement of the straightening marks which are to be sighted by the microscope.

A still further object of the invention is to place the straightening mark on a body which is hung swingingly on a suspension means that is set axially in the turning plug of the table plate in such a manner that the swinging axis running parallel to the tilting axis of the table intersects the rotating axis of the table at a predetermined point, with the effect that the reference point formed by the straightening marks in the various tilted positions of the table top always overlies the crossing point of the tilting axis with the rotating axis.

It is furthermore an object of the invention to provide an additional use for the usual microscope forming a part of or an auxiliary to the usual drilling machine.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates an elevation with parts broken away and parts in section of a drilling machine and shows the adjusting device in position for use under the drilling spindle of a drilling machine;

Figure 2 illustrates an enlarged fragmentary vertical section and shows the device in position for use;

Figure 3 illustrates an elevation partly broken away and partly in section of a detail;

Figure 4 illustrates a plan view of the detail of Fig. 3;

Figure 5 illustrates an enlarged fragmentary elevation partly in section of another embodiment of the detail of Fig. 3;

Figure 6 illustrates an elevation of a locking device;

Figure 7 illustrates a diagrammatic view of the reference mark in the optical system of the sight microscope; and Figure 8 illustrates a fragmentary vertical section showing the adjusting process on a workpiece.

Of the rotatable and tiltable inclined table and the drilling machine, only the parts necessary for an understanding of the invention are shown and described. The circular table top 1 of the inclined table is rotatable around axis A, for which its turning plug 1ª (Fig. 2) is mounted in a bore 3ª of the base 3. The circle sections are adjusted by means of a worm 2 and worm gear 2ª which are actuated by hand and which turn the table top 1. The worm wheel 2ª is connected with the table top 1 and the worm gear 2 is mounted in the base 3. The table top 1 with the base 3 is rotatably and tiltably mounted around axis B in a range of 0–90°. The axis B is at right angles to the turning axis A of the table top 1. The tilting axis B is mounted in the frame 4 in any suitable manner (not shown). The floor frame 4 is mounted by any suitable means, such as the bolts 4ª, 4ᵇ on the main working table 6 of the drilling machine. On the base 3 is a worm wheel 8ª which is actuated by a worm 8 mounted in the floor frame 4. On the shaft 8ᵇ of the worm 8 is a second worm wheel 9ª which engages a worm 9 also mounted in the floor frame 4. When the worm 9 is turned by hand, the base frame 3, together with the table top 1, is inclined to any angle between 0–90° by means of the gear parts 9ª, 8ᵇ, 8, 8ª. The angle of the incline is read on the scale 31 which connects with the nonius 32. The main slide 6 of the drill is movable in a horizontal plane in two directions which cross each other at right angles.

To make later adjustments, it is necessary to bring the table top 1 first in a starting position. This is done when the drilling spindle axis D intersects the turning axis A of the table top 1 at a fixed distance from the surface of the table. To determine this starting position, the auxiliary tool of the invention is used. The carrying part of the tool is the support 10 which is composed of a substantially fork-shaped part 10ª, a substantially conically-shaped part 10ᵇ, and a shaft 10ᶜ with the threaded part 10ᵈ. The support 10 is placed axially in an oversized bore 11, which latter goes through the turning bolt 1ª of the table top 1 and is connected thereto by the thread nut 10ᵉ which is screwed on the threaded part 10ᵈ. The conical part 10ᵇ fits in the outer end of the bore 11 and thereby guarantees the accurate adjustment of the middle axis of the shaft 10 with the turning axis A of the table top 1. The means 10, 10ᵇ, 10ᶜ, 10ᵈ, 10ᵉ for centering the tool and attaching it to the table top 1 are to be considered only as examples of numerous other means for accomplishing the same purpose, as obviously, other centering and fastening means could be used with equally good results. In the forked part 10ª, a body 12 is swingably hung for movement around a turning joint axis C. The swinging axis C is at a distance X from the surface of the table top 1. The support 10 is always placed in the bore 11 in such manner that the swinging axis C is parallel to the tilting axis B. To bring about this result in an easy manner, a mark 13 is placed on the outside of the support 10 and cooperates with a counter mark 14 (see Fig. 4) on the surface of the table top 1. Instead of the mark 13 and its counter mark, any other suitable means such as stops or the like can be provided. The swinging axis C is formed, for instance, by means of adjustable conical points 18, 19 (Fig. 3), which grip corresponding conical recesses in the body 12. The center of gravity of the body 12 is so far below the turning joint axis C that the body 12 always adjusts itself vertically by gravity. On the upper part of the swinging body 12, a so-called anvil 16 is mounted, on which there is a measuring mark 17. The measuring mark 17 can, for instance, be formed from a cross of two fine hairs. The body 12 together with the anvil 16 is so adjusted that during the swinging of the table top 1, the movement of the crossing point of the adjusting mark 17 is always in the same plane as the movement of the turning axis A. The measuring mark 17 of the swinging body 12 is sighted by means of the sight microscope 20, which latter is set in the drilling spindle 15. When the table is tilting around axis B, the swinging body 12 adjusts itself to each swinging plane vertically so that the crossing point of the adjusting cross 17 always remains at the distance $y$ from the table top 1, said distance $y$ always being measured through the turning axis A of the table top 1. In other words, the crossing point of the adjusting cross 17 always overlies the crossing point of the swinging axis C and the turning axis A.

The sighting microscope now to be described is shown by way of a typical example of a microscope for accomplishing the same result. Other microscopes can be used with an equally good result. The microscope 20, which is mounted by means of a Morse cone 20ª in the drilling spindle 15, has a bent optical axis. The microscope 20 is furnished with an arrangement for inside lighting comprising the electric glow lamp 29 which is situated underneath the Morse cone 20ª in the microscope housing. The light rays of the glow lamp 29 are projected by means of a lens 30, the double prism 28, which acts as a semi-transparent slanting mirror, and the objective 27, upon the object. The object, that is, the mark 17, is reflected over the objective and the mirror surface of the prism 28 onto the field of vision of the oculars 26 and in this manner on the thread cross 25 between the ocular and the prism. The thread cross 25 is so adjusted that its cross point coincides with the optical axis of the microscope and in this manner with the axis D of the drilling spindle.

The adjustment of the table top 1 to the starting position is accomplished in the usual manner by sliding the main slide 6 of the machine until the direction mark 17 is covered with the thread cross 25 in the optical system of the sight microscope 20. The distance $y$ changes but always corresponds to the adjusted incline angle $\alpha$ according to the formula $y = x \cdot \cos \alpha$. Value $y$ (Fig. 8) is then to be used for the adjustment of the working tool in the working position.

It is recommended that the direction mark 17 be placed in the swinging axis C, since then possibly very small inaccuracies in the vertical position of the body 12 are not being registered. Figure 5 shows such an embodiment. Here, the anvil 16ª is mounted in a bore 12ª of the swinging body 112 in such a manner that its surface, on which a mark (not shown) but similar to the mark 17 is located, lies in the joint axis C.

For this purpose, the anvil 16ª is held by three screws 21 of which only one is shown in Fig. 5. With the assistance of these screws, the anvil 6 and with it the direction mark can easily be adjusted into exact coincidence to the axis A. This has the advantage that one is independent of the conical points 18, 19 for accuracy.

To avoid damaging of the swinging body 112 or the point joint when the device is not in use, a means is provided to lock the body 112 with the part 110ª of the shaft 10. The locking device can be shaped in such a manner that the body 112 has a transverse bore 12ᵇ and the part 110ª has transverse bores 22 and 23. The outer end of the bore 23 is reduced to form a conical shape. The locking is then done by means of a pin 24 which is locked in the bore 23 protruding with its forepart 24ª through the bores 22 and 12ᵇ. In this way, the body 112 will be prevented from any swinging motions. The mark 17 can be covered when not in use by a protecting cap (not shown), which is placed on the upper part of the body 112.

In Fig. 8, the adjusting process is shown in more detail on a workpiece. In the workpiece W which is a rotating body with the cylindrical bore hole K, two holes $L^1$ and $L^2$ are to be drilled, both of which are inclined to the same sloping angle $\alpha$ to the top of the table or the stretching plane. The position of the holes $L^1$ and $L^2$ is further determined through the mass R and $f$. R is the radius of the circle from the middle axis of the drill hole K on which the holes $L^1$ and $L^2$ lie and $f$ is the distance from the stretching plane to the transversal point of the axis of the holes $L^1$, $L^2$ with the workpiece plane $i$. The stretching plane is formed by the top of table 1.

First, the table top 1 is swung so that the table turn axis A is inclined in angle $\alpha$ to the horizontal plane. Next, the adjusting tool 10, 12, 17 is placed in the drill hole 11 of the table top 1 and the table is brought in the starting position to the drill spindle axis D, as described above. The sight point, through which the drill spindle axis D passes, has been designated in Fig. 8 by P, while the transversal point of the axis A with the surface of the table top 1 is designated by M. After the adjusting tool 10, 12, 17 has again been removed, the workpiece W is stretched on the table top in such a manner that the axis of the drill hole K coincides with the table turn axis A. The stretching means are not shown in Fig. 8, for the sake of clarity. To drill the hole $L^1$ it is now only necessary to slide the main slide 6 of the drilling machine from the starting point in the direction of the arrow $t$ for the distance $z$. The distance $z$ has been computed prior in the following manner:

$$z = h + y - g$$

In this is:

$$h = R \cdot \sin \alpha$$
$$y = x \cdot \cos \alpha$$
$$g = f \cdot \cos \alpha$$

Accordingly:

$$z = R \cdot \sin \alpha + x \cdot \cos \alpha - f \cdot \cos \alpha$$
$$z = R \cdot \sin \alpha + \cos \alpha \cdot (x - f)$$

After the hole $L^1$ has been drilled, the table is rotated 180° around axis A and now the hole $L^2$ can be drilled.

The device of the invention is obviously not confined to the use in gauge drilling machines but can be used wherever a tilting workpiece stretching plate is to be brought into the desired relation to the axis of a tool spindle. Consequently, I do not limit myself to the precise use illustrated nor to the particular structure shown, except as hereinafter claimed.

I claim:

1. In a coordinate drilling machine including a rotatably and tiltably mounted work supporting table, a drilling spindle, and a microscope for centering said spindle on the work; means for adjusting said table to the axis of said spindle comprising a member mounted axially of said table with respect to the rotating axis thereof and outwardly of the surface of said table, means mounting said member for free swinging movement in the plane of both the rotating axis of said table and the axis of said spindle, the swinging axis of said member being offset with respect to the center of gravity thereof, said axis and the tilting axis of said table being parallel, the swinging axis of said member intersecting the rotatable axis extended of said table a predetermined distance outwardly of the surface of said table, a sighting mark on an upper surface of said member above the swinging axis thereof, said mark being positioned to overlie at all times the point of intersection of said swinging axis of said member and the rotating axis extended of said table irrespective of the tilted position of said table.

2. In a coordinate drilling machine including a rotatably and tiltably mounted work supporting table, a drilling spindle, and a microscope for centering said spindle on the work; means for adjusting said table to the axis of said spindle comprising a member mounted axially of said table with respect to the rotating axis thereof and outwardly of the surface of said table, means mounting said member for free swinging movement in the plane of both the rotating axis of said table and the axis of said spindle, the swinging axis of said member being offset with respect to the center of gravity thereof, said axis and the tilting axis of said table being parallel, the swinging axis of said member intersecting the rotatable axis extended of said table a predetermined distance outwardly of the surface of said table, a sighting mark on said member substantially on the swinging axis thereof, and means for positioning said mark at the point of intersection of said swinging axis of said member and the rotating axis of said table.

3. In a coordinate drilling machine including a rotatably and tiltably mounted work supporting table, a drilling spindle, and a microscope for centering said spindle on the work; means for adjusting said table to the axis of said spindle comprising a member mounted axially of said table with respect to the rotating axis thereof and outwardly of the surface of said table, means mounting said member for free swinging movement in the plane of both the rotating axis of said table and the axis of said spindle, the swinging axis of said member being offset with respect to the center of gravity thereof, said axis and the tilting axis of said table being parallel, the swinging axis of said member intersecting the rotatable axis extended of said table a predetermined distance outwardly of the surface of said table, a sighting mark on said member, said mark always indicating the point of intersection of said swinging axis of said member with the rotating axis of said table at all times.

4. In a coordinate drilling machine including a rotatably and tiltably mounted work supporting table, a drilling spindle, and a microscope for centering said spindle on the work; means for adjusting said table to the axis of said spindle comprising a member mounted axially of said table with respect to the rotating axis thereof and outwardly of the surface of said table, means mounting said member for free swinging movement in the plane of both rotating axis of said table and the axis of said spindle, the swinging axis of said member being offset with respect to the center of gravity thereof, said axis and the tilting axis of said table being parallel, the swinging axis of said member intersecting the rotatable axis extended of said table a predetermined distance outwardly of the surface of said table, a sighting mark on said member adjacent the swinging axis thereof and having a substantial coincidence with the point of intersection of said swinging axis of said member with the rotating axis of said table at all times, said mounting means for said member comprising a support, a pair of axially alined, spaced and opposed conical points carried by said support, said points engaging opposite sides of said member.

5. In a coordinate drilling machine including a work supporting table rotatable in one plane and tiltable in a plane at right angles to the axis of rotation, a drilling spindle, and a microscope for centering said spindle on the work; means for adjusting said table with respect to the axis of said spindle, comprising means mounted axially of said table with respect to the rotating axis thereof and extending outwardly of the surface of said table, a member mounted for free swinging movement on the outer end of said last named means in the plane of both the rotating axis of said table and the axis of said spindle, means for adjusting said last named means to position the swinging axis of said member parallel to the tilting axis of said table, the swinging axis of said member being offset with respect to the center of gravity thereof, the swinging axis of said member intersecting the rotating axis extended of said table a predetermined distance outwardly of the surface of said table, a sighting mark on said member, said mark always indicating the point of intersection of said swinging axis of said member and the rotating axis extended of said table irrespective of the degree of tilt of said table.

6. In a coordinate drilling machine including a work supporting table rotatable in one plane and tiltable in a plane at right angles to the axis of rotation, a drilling spindle, and a microscope for centering said spindle on the work; means for adjusting said table with respect to the axis of said spindle, comprising means mounted axially of said table with respect to the rotating axis thereof and extending outwardly of the surface of said table, a member mounted for free swinging movement on the outer end of said last named means in the plane of both the rotating axis of said table and the axis of said spindle, the swinging axis of said member being parallel to the tilting axis of said table and said swinging axis being offset with respect to the center of gravity of said member, said swinging axis intersecting said rotating axis extended a predetermined distance outwardly of the surface of said table, a sighting mark on said member, said mark always indicating the point of intersection of said swinging axis of said member with the rotating axis of said table irrespective of the degree of tilt of said table, and means for locking said member against swinging movement.

GEORG MÖLLER.